United States Patent [19]

Hirtl et al.

[11] Patent Number: 5,098,537

[45] Date of Patent: Mar. 24, 1992

[54] CATHODICALLY DEPOSITABLE ELECTRODEPOSITION COATING BATHS COMPRISING SURFACE-IMPROVING ADDITIVES, AND USE OF THE ADDITIVES IN COATING PROCESSES

[75] Inventors: Johann Hirtl; Heinz-Peter Katzmann; Klausjörg Klein, all of Wuppertal, Fed. Rep. of Germany

[73] Assignee: Herberts Gesellschaft mit beschrankter Haftung, Wuppertal, Fed. Rep. of Germany

[21] Appl. No.: 710,063

[22] Filed: Jun. 4, 1991

[30] Foreign Application Priority Data

Jun. 13, 1990 [DE] Fed. Rep. of Germany ....... 4018876

[51] Int. Cl.$^5$ .................. C25D 13/10; C08J 3/215
[52] U.S. Cl. ............... 204/181.7; 204/181.4; 524/513
[58] Field of Search ............ 204/181.4, 181.7; 524/513

[56] References Cited

U.S. PATENT DOCUMENTS

| 4,156,667 | 5/1979 | Turpin | 204/181.4 |
| 4,430,462 | 2/1984 | Jaeger et al. | 204/181.7 |
| 4,891,111 | 1/1990 | McCollum et al. | 204/181.7 |

*Primary Examiner*—John Niebling
*Assistant Examiner*—Kishor Mayekar
*Attorney, Agent, or Firm*—Schweitzer Cornman & Gross

[57] ABSTRACT

Aqueous electrodeposition coating baths containing cathodically depositable binders and having a content of homopolymers or copolymers of an alkyl vinyl ether, characterized in that the baths contain the following surface-improving additives:

0.1 to 5 wt. % of one or more homopolymers or copolymers of an alkyl vinyl ether with 1 to 5 carbon atoms in the alkyl radical and having a weight average molecular weight of 500 to 10000, together with 0.1 to 2 wt. % of one or more polyesters comprising β-hydroxyalkyl ester groups, with an acid number of 0 to 3 and a weight average molecular weight of 1000 to 10000, the percentages by weight relating to the solids in the binders, and the proportions by weight of alkyl vinyl ether homopolymers or copolymers to polyester being in the ratio 1:10 to 10:1, relative in each case to the resin solids.

4 Claims, No Drawings

CATHODICALLY DEPOSITABLE ELECTRODEPOSITION COATING BATHS COMPRISING SURFACE-IMPROVING ADDITIVES, AND USE OF THE ADDITIVES IN COATING PROCESSES

BACKGROUND OF THE INVENTION

The invention relates to surface-improving additives for cathodic electrodeposition coating (German abbreviation KTL), and relates more particularly to addition of anti-pitting agents.

Cathodic electrodeposition coating (KTL) is a frequently used method, particularly for priming car bodies, in which water-thinnable synthetic resins bearing cationic groups are deposited on to electrically conductive members, using dc. This method is described in the literature and widely used in practice. In it, a workpiece having an electrically conductive surface of metal or electrically conductive plastics is placed in an aqueous electrodeposition bath and connected as cathode to a dc source, after which the lacquer on the surface is coagulated by the current (EP-B 0 066 859, EP-A-0 004 090, DE-A-32 15 891). The electrodeposition bath comprises an aqueous dispersion, e.g. a suspension or emulsion or aqueous solution, of one or more binders made waterdispersible by partial salt formation with organic or inorganic neutralising agents, and of pigments, fillers and additives dispersed therein, dispersed solvents and other adjuvants.

Lacquer materials having the aforementioned composition are designed to produce smooth surfaces after deposition and cross-linking of the resulting film. The surfaces uniformly cover faults in the substrate. They are used to produce a substrate for the subsequent layers, so as to obtain a high-quality coating lacquer. In practice, however, surface faults, particularly pits, frequently occur in the KTL film after stoving, or the surfaces are non-uniform. These faults may be due to the electrodeposition coating materials used, but frequently originate from impurities which find their way into the electrodeposition coating bath. The impurities from the lacquer material may be gel particles from binder manufacture, damaged resin particles from pigment paste manufacture, pigment impurities or foreign substances from equipment for producing the corresponding materials. The subsequently-introduced foreign substances may e.g. be deep-drawing grease, anti-corrosion grease, seam-sealing materials or substances used in pretreatment.

Another class of impurities are deposited from the air after the electrodeposition lacquer coating has been deposited and before the lacquer film has become crosslinked. Examples of such impurities are fluorine-containing or silicone-containing aerosols or lubricants from the systems required for conveying the parts for coating.

These substances may enter the lacquer film before stoving and produce surface faults such as pits during stoving e.g. because of incompatibility. The damage caused by these materials cannot be predicted but must be determined by experiment.

These surface faults necessitate expensive after-treatment, to obtain a smooth surface for the subsequent layers. To ensure continuous production, surface faults of this kind must be avoided. It is difficult to eliminate the varied causes of pits, and therefore the usual aim is to avoid pitting by using additives.

Silicone oils or fluorine-containing organic substances are known examples of anti-pitting additives. These eliminate pits in the layer in which they are used, but often cause serious surface faults in subsequent layers. Also, the subsequent layers do not adhere firmly to the treated substrates. These additives are therefore unsuitable for KTL layers.

An attempt has therefore been made to find other non silicone-containing additives, in order to avoid these frequent surface faults. Polyoxyalkylene polyamine reaction products with epoxy resins are additives to KTL systems and are described in US-A-4 810 535. The aim is to avoid pits. EP-A-0 324 961 describes polyoxyalkylene polyamines which are added to KTL baths in order to obtain fault-free film surfaces. DE-A-38 30 626 describes modified acrylates which are additives to KTL baths and are optionally neutralised before being added to the lacquer material. The aim as before is to avoid various kinds of surface faults. EP-A-0 301 293 describes cathodic electrodeposition coating baths in which the additives are homopolymers or copolymers of an alkyl vinyl ether. All these materials have to be added in relatively large quantities to have an anti-pitting effect. This results in a difficulty, in that there is a marked adverse effect on adhesion to subsequent layers, e.g. fillers or polyvinyl chloride materials.

Irrespective of the cause of pits, the efficiency of the known anti-pitting agents for KTL systems is inadequate in practice. Even large amounts of these additives do not completely eliminate pits, and consequently the substrates frequently require after-treatment, e.g. by grinding or additional lacquering.

SUMMARY OF THE INVENTION

The aim therefore is to prepare surface-improving agents, more particularly an anti-pitting agent, which has improved efficiency no disadvantageous side-effects, and ensures good adhesion of subsequent coatings.

To this end, polyvinyl ethers (weight average molecular weight 500 to 10000) together with polyesters (weight average molecular weight 1000 to 10000) having an acid number not exceeding 3 and containing $\beta$-hydroxyalkyl ester groups and preferably not being completely compatible with the KTL binder, are added to the KTL bath, the polyester being used in a proportion of 0.1 to 2%, preferably 0.1 to 1% by weight relative to the KTL binder including optional cross-linking agents, and the proportions by weight of polyvinyl ether to polyester being in the ratio 1:10 to 10:1.

Polyesters having an acid number of not more than 3 and substantially free from acid groups and containing $\beta$-hydroxyester groups are described as cross-linking agents in EP-A-0 012 463, EP-A 0 066 859 and DE-A-34 36 345. It is not yet known to use them together with polyvinyl ethers as anti-pitting agents and in a quantity which is too small for cross-linking.

It has been found according to the invention that non-acid polycarboxylic acid radicals containing at least two terminal or side saturated or unsaturated $\beta$-hydroxyalkyl ester groups per molecule and having a weight average molecular weight of 1000 to 10000 act as surface-improving agents if used in KTL systems in a proportion not exceeding 2 wt.% relative to the KTL binder plus optionally present cross-linking agents (relative in each case to the resin solids), and mixed with homopolymers or copolymers of alkyl vinyl ethers in which the alkyl radical contains 1 to 5 carbon atoms and which are in a proportion of not more than 5 wt.% (likewise relative to the KTL binders plus optionally present cross-linking agents, and relative in each case to the resin solids). When this mixture is used in KTL deposition, the resulting surfaces are smooth and free from pits and faults and adhere sufficiently to subsequent layers. The effect of the additive mixtures used according to the invention is unexpected, since neither of the two individual components completely eliminates surface faults even if used in elevated amounts. The mixture is needed before all surface faults are eliminated.

The anti-pitting agent according to the invention can be used in the form of a prefabricated mixture, or alternatively the two components in the stated proportions can be added separately to the electrodeposition coating bath. The sequence in which they are added is unimportant. The anti-pitting agents according to the invention are used in small quantities and thus eliminate the disadvantages of larger proportions of anti pitting additives, e.g. impaired adhesion or a rough surface.

The electrodeposition coating baths according to the invention are conventional and comprise an aqueous solution of cathodically depositable self-cross-linking or externally cross linked synthetic resins, conventional pigments and/or fillers and other conventional lacquer additives and adjuvants. The surface-improving agents can be added to the electrodeposition coating baths beforehand during manufacture or subsequently and immediately before use in electrodeposition coating. As mentioned, the two components of the anti-pitting agent according to the invention can be added separately or as a mixture.

The anti-pitting agents according to the invention are used in a small quantity. In individual cases it may be advantageous to choose the amount of mixture or the amount of individual components experimentally within the stated limits, so as to eliminate all pits in the deposited coating.

The amount of additives is chosen so as to eliminate all pits in the deposited coating. If the chosen amount is too high, there is an adverse effect on surface faults, such as adhesion of the subsequent layers. If the amount is too low, the anti-pitting effect is inadequate. In that case the amount of anti-pitting agent must be increased.

The polyalkyl vinyl ethers used in the anti-pitting agents according to the invention are polymers of alkyl vinyl ethers in which the alkyl radical has 1 to 5, preferably 2 to 4 carbon atoms. The substances are homopolymers or polymers of various alkyl vinyl ether monomers. Copolymers containing up to 25% comonomer can also be used. The comonomers may advantageously be olefinically unsaturated monomers which are copolymerisable with the alkyl vinyl ethers and preferably contain no functional, more particularly no water-solubilising, groups. Examples of such substances are styrene, alkyl acrylates and/or alkyl methacrylates, the alkyl radicals being e.g. methyl or ethyl. The weight average molecular weight of the resulting polymers and copolymers should be between 500 and 10000. The polyvinyl akyl ethers used do not have any functional groups in the side chain and are not soluble in water.

The non-acid polyesters used in the anti-pitting agents according to the invention and containing side or terminal $\beta$-hydroxyalkyl ester groups are esters of aromatic polycarboxylic acids such as isophthalic acid, terephthalic acid, trimellitic acid or mixtures thereof. These substances are condensed e.g. with ethylene glycol, neopentyl glycol, trimethylol propane and/or pentaerythritol. The carboxyl groups are then reacted with optionally substituted 1,2-glycols to form $\beta$-hydroxyalkyl compounds. The 1,2-glycols can be substituted by saturated or unsaturated alkyl, ether, ester or amide groups. Another alternative is the formation of hydroxyalkyl esters in which the carboxyl groups are reacted with substituted glycidyl compounds such as glycidyl ethers or glycidyl esters.

Preferably the product contains more than 3 $\beta$-hydroxyalkyl ester groups per molecule and has a weight average molecular weight of 1000 to 10000, preferably 1500 to 5000. The non-acid polyesters used according to the invention and containing side or terminal $\beta$-hydroxyalkyl ester groups can be manufactured as described e.g. in EP-A-0 012 463. The compounds described therein are also examples of polyesters of use according to the invention.

The polyesters suitable for the purpose according to the invention are characterised preferably by limited miscibility with KTL binders. In individual cases the compatibility can be determined as follows: the binder, together with optionally present cross-linking agents, is mixed with the polyester in the weight ratio of 9:1 and diluted to 75% solids with butyl glycol. The sample must give a mixture which is initially homogeneous but segregates within two days on standing. If compatibility is complete (i.e. no segregation within two days), the anti-pitting effect is weak. If incompatibility is completed, i.e. no homogeneous miscibility, the adhesion of subsequent layers is seriously impaired.

The functionalised polyester is used in quantities not exceeding 2 wt.%, preferably not exceeding 1 wt.% relative to the solids in the KTL binder including cross-linking agents. Although this additive cannot be prevented from reacting with the KTL binders on heating to higher temperatures, the small quantity of the additive does not act as a cross-linking agent. The polyalkyl vinyl ether is not functionalised. It should not react with the KTL binder during stoving. The amount used does not exceed 5 wt.%, preferably 3 wt.%, in each case relative to the solids in the KTL binder including cross-linking agents. The skilled addressee can easily determine the optimum mixture by experiments. For example, an additive can be added until a smooth surface with only a few pits is obtained. A small amount of the other additive can then be added, so as to eliminate the remaining surface faults. The film then has a smooth homogeneous surface and does not impair the adhesion of subsequent layers.

The binders used in the electrodeposition coating baths contain basic resins normally used for this purpose and have basic groups containing sulphur, nitrogen or phosphorus. The preferred groups are basic and contain nitrogen. These groups can be quaternised, or are converted into ionic groups by means of a conventional neutralising agent such as organic monocarboxylic acids.

Basic basic resins are resins containing primary, secondary or tertiary amino groups having amine numbers between e.g. 20 and 250. The weight average molecular weight of the basic resins is preferably between 300 and 10000. The basic groups are $-NH_2$, $-NRM$, $-NR_2$ and $\pm NR_3$, or also e.g. $\pm SR_2$ or $\pm PR_3$, where R is e.g an alkyl radical with 1 to 4 carbon atoms and the radicals R can be the same or different. Nitrogen-containing basic groups are preferred. The neutralising agents, which act as anions in the aqueous binder solutions, can be the inorganic and/or organic acids which are theoretically known and used in practice. The acids used in practice are mainly monovalent and make the binder easily soluble. Formic acid, acetic acid, lactic acid and alkyl phosphoric acids are preferred.

The basic resins may e.g. be aminoepoxy resins, aminoepoxy resins with terminal double bonds, aminopolyurethane resins, polybutadiene resins containing amino groups or modified epoxy-carbon dioxide-amine reaction products.

Aminoepoxy resins are preferred, particularly those based on bisphenol A. These basic resins are described in the literature, e.g. in EP-A-0 082 291 and DE-A-32 34 395.

The basic resins can be self-cross linking or externally cross-linking. Externally cross-linking basic resins can be linked by conventional substances such as triazine resins, blocked isocyanates, cross-linking agents with terminal double bonds or cross-linking agents with activated double bonds and capable of Michael addition with active hydrogen. These are described e.g. in EP-A-0 245 786, EP-A-0 004 090, EP-A-0 319 929, DE-A-37 20 956 and DE-A-0 193 685, U.S. Pat. No. 4 810 535 and DE-A-38 30 626. The various cross-linking agents can be used individually or mixed together with the basic resins.

The electrodeposition lacquers used according to the invention can contain pigments. The pigments can be the normal pigments and/or fillers used for KTL deposition, e.g. carbon black, litanium dioxide, red iron oxide, kaolin, talc or silicon dioxide. The pigments are preferably dispersed in conventional pigment paste resins and are pasted. These resins are described e.g. in EP-B-0 183 025. The manufacture of pigment pastes and of cathodic electrodeposition baths is a routine matter to the skilled addressee. For example, pigments and/or fillers can be dispersed in conventional pasting binders and then ground in a suitable unit such as a pearl mill. The resulting pigment pastes can then be added to the KTL binders in various ways, e.g. by mixing with them. The material can then be diluted with completely demineralised water to produce the KTL coating bath. Another alternative, for example, is first to convert the neutralised and consequently water-soluble binder or binder mixture into a dispersion. The dispersion is then additionally diluted with completely demineralised water, followed by addition of the aqueous pigment paste. The result as before is a KTL bath of use for coating. The electrodeposition coating baths used according to the invention contain pigments, fillers and also the aforementioned neutralising agents. They can also contain conventional KTL-bath solvents and/or other conventional lacquer additives or adjuvants such as anti foaming agents or catalysts.

As mentioned the anti-pitting additives according to the invention can be used either individually or together. For this purpose they can e.g. be dispersed in the binder mixture before or after neutralising and converted to the dispersion phase together with the binder. In an example of another method, the binder is converted to the aqueous phase, after which the additives are supplied individually or together e.g. with an adjuvant such as a part of the dispersible neutralised resins or the neutralised paste resin or a suitable solvent of the dispersion. After thorough homogenisation, the additives will have been incorporated in stable manner.

Another possibility is to incorporate the anti-pitting additives in the pigment paste. This is advantageously done before the pigment paste is ground, thus ensuring that the additives are homogeneously distributed in the pigment paste. The resulting pastes are stable and have the desired properties after being added to the electrodeposition lacquer coating bath.

In principle, the two additives can be used together or separately. Alternatively the additives can be added subsequently to the KTL baths ready for coating. To this end the additives need only be converted into a water-thinnable form, e.g. by solvents, water-dispersible emulsifiers, soluble binders or soluble paste resins. This method is particularly suitable if it has been found that surface faults occur when working with an existing coating bath. After the anti-pitting agent according to the invention has been added, these faults are eliminated.

The electrodeposition coating baths comprising anti-pitting agents according to the invention can be used under normal conditions to coat various substrates. After stoving, the substrates have a smooth, pit free surface. The anti-pitting additives according to the invention do not influence other properties of lacquer, such as protection against corrosion or gravel or as regards adhesion to subsequent layers. The anti-pitting agents according to the invention are therefore particularly suitable for the motor-vehicle sector, e.g. for priming car bodies or parts thereof, followed by multilayer lacquering.

The following examples illustrate the invention. Unless stated otherwise, all percentages and parts are by weight. The solids were determined as per DIN 53 182 at 150° C.

DETAILED DESCRIPTION OF COMPONENTS OF THE INVENTION

Binder example 1

As per EP-A-1 012 463, 391 g of diethanolamine, 189 g of 3-(N-N-dimethylamino)-propylamine and 1147 g of an adduct of 2 mol 1,6- hexanediamine and 4 mol glycidyl ester of versatic acid (Cardura ® E 10 by Shell) were added to 5273 g of bisphenol A epoxy resin (epoxy equivalent weight approx. 475) in 8000 g ethoxy propanol. The reaction mixture was kept at 85° to 90° C. with agitation for 4 hours and then at 120° C. for 1 hour. It was then diluted with ethoxy propanol to a solid content of 60%.

Binder example 2

160 g caprolactam were slowly added at 70° C. to 431 g of a solution (75% in ethyl acetate) of a reaction product of 3 mol toluylene diisocyanate and 1 mol trimethylolpropane (Desmodur ®). The reaction mixture was then kept at 70° C. until the NCO content had fallen practically to zero. Next, 2-butoxyethanol (204 g) was added and the ethyl acetate was distilled off over a column until the solid content was 70%.

Binder example 3a 1155 g of a resin as per example 1 and 425 g as per example 2 were mixed and then distilled in vacuo to about 85% solids. 45 mmol formic acid (50%) per 100 g solids were then added and then diluted to about 30% solids with completely demineralised water.

Binder example 3b

The procedure was exactly as in example 3a, except that 6.6 g of the anti-pitting component in example 6 was added to the binders.

Binder example 8c

The procedure was as in example 3a, except that 13.2 g of a commercial polyethyl vinyl ether (M+1000-10000) was added to the resins.

Binder example 3d

The procedure was in example 3a, except that 6.6 of anti-pitting agent component as per example 6 and 13.2 g of a commercial polyethyl vinyl ether (M+1000-10000) was added.

Binder example 4a 228 parts of bisphenol A (1 mol) was reacted with 260 parts of diethyl aminopropyl amine (2 mol) and 66 parts of paraformaldehyde (91%; 2 mol) in the presence of 131 parts toluene azeotropic entraining agent until 42 parts of water had separated. After 152 parts of diethylene glycol dimethyl ether had been added and the product had been cooled to 30° C., 608 parts (2 mol) of a toluylene diisocyanate semiblocked with 2-ethyl hexanol was added within 45 minutes. After a practically zero NCO content had been reached, 1400 parts of the solution was mixed with a solution of 190 parts of an epoxy resin based on bisphenol A (epoxy equivalent weight approx. 190) and 250 parts (1 mol) of a glycidyl ester of a saturated tertiary $C_9$ to $C_{11}$ monocarboxylic acid in 389 parts of diethylene glycol dimethyl ether and reacted at 95° to 100° C. until the epoxy value was zero. The binder was easily soluble in water after adding 40 mol of formic acid (50%) per 1000 g solids. The solid content was adjusted to 35%.

Binder example 4b

The procedure was as in example 4a except that 17.2 g of the anti-pitting agent component as per example 6 and 17.2 g of a polyethyl vinyl ether (M+1000-10000) was added before dilution with water.

Pigment paste example 5

55 g of formic acid (50%) and 485 g of completely demineralised water was added to 188 g of a pigment resin as per EP-B-0 183 025, example 5 (80%), using a high-speed agitator. 30 g carbon black, 10 g pyrogenic silica, 30 g dibutyl tin oxide powder, 30 g lead silicate and 500 g titanium dioxide were added to the mixture. The solid content was adjusted to about 48% with about 200 g completely demineralised water and the mixture was ground in a pearl mill. A stable pigment paste was obtained.

Additive example 6

Manufacture of a polyester containing β-hydroxyester groups and of use as an anti-pitting agent component 768 g of trimellitic acid anhydride and 2000 g of a glycidyl ester of a branched tertiary $C_{10}$ monocarboxylic acid (Cardura E10 ®) were carefully heated to 190° C. with agitation, and an exothermic reaction began above 90° C. The reacted material was cooled to 140° C. and 2.75 g of N,N-dimethyl benzyl amine were added. The material was kept at 145° C. until the acid number was below 3 mg KOH/g. A calculated quantity of Cardura E10 ® was added when necessary. The reaction product was diluted to 80% solids with 2-butoxyethanol.

Lacquer example 7a-d 600 g of a pigment paste as per example 5 was added with thorough agitation to 1700 g of a dispersion as per examples 3a-d. The mixture was then diluted with 1700 g of completely demineralised water. 4 g of a pitting substance (ASTM oil No. 1, made by Messrs Fuchs-Mineralölwerke GmbH, Mannheim) was added to the baths and thoroughly homogenised.

Lacquer example 7e 3.5 g of the anti-pitting agent component in example 6, mixed with the paste resin (1:1), neutralised with 30 mmol formic acid per 1000 g solids and diluted with butyl glycol to 50% solids was subsequently added to the bath in example 7c. The mixture was thoroughly homogenised.

These KTL baths were used to coat conventional zinc-phosphated steel sheets (layer thickness about 20 μm) and stoved at 170° C. for 30 minutes. The surface and the adhesion of polyvinyl chloride (PVC) materials to the surface was evaluated.

| Batch | Surface | Adhesion of PVC |
|---|---|---|
| 7a (comparison) | Pits | Good |
| 7b (comparison) | Pits | Good |
| 7c (comparison) | Pits | Good |
| 7d | Good | Good |
| 7e | Good | Good |

As can be seen, no anti-pitting effect was obtained with batch 7a without anti-pitting agent, batch 7b using the polyester with β-hydroxyester groups only, or batch 7c using polyalkyl vinyl ether only. It was only the combined use of the anti-pitting agent components according to the invention (polyester with β-hydroxyester groups and polyalkyl vinyl ether) in batches 7d and 7e which resulted in a pit-free surface and good subsequent adhesion.

Lacquer example 8a-b 360 g of the pigment paste in example 5 was added to 1130 g of a dispersion as per example 4a, b and then made up to 3000 g with completely demineralised water and vigorous agitation. 3 g of a pitting substance (Anticorrit 15N-68 by Messrs Fuchs-Mineralölwerke, Mannheim) were added to the bath and stirred in overnight.

Lacquer example 8c 0.5 g of the anti-pitting agent component as per example 6 was added to 360 g of pigment paste as per example 5 and thoroughly dispersed. A KTL bath was then prepared therefrom, as in example 8a.

Lacquer example 8d 8.6 g of the anti-pitting agent component in example 6 was added to 360 g of a paste as per example 5 and thoroughly homogenised. It was then used to prepare a KTL bath as per example 8a.

Conventional zinc-phosphated steel sheets were coated in these KTL baths (20 μm thickness of dry film) and stoved at 170° C. for 30 minutes. The surface and the adhesion of PVC materials to the surface were evaluated.

| Batch | Surface | Adhesion of PVC |
| --- | --- | --- |
| 8a (comparison) | Pits | Good |
| 8b | Good | Good |
| 8c (comparison) | Pits | Good |
| 8d (comparison) | Good | Bad |

As can be seen, only the anti-pitting agent according to the invention in batch 8b was a good anti-pitting effect with good subsequent adhesion.

The anti-corrosion results for the various batches were comparable and good. The PVC materials were conventional underseal materials by Messrs Dr A Stankiewicz GmbM, Celle and Teroson GmbH, Meidelberg; they were applied in a 3 mm layer, stoved at 140° C. for 10 minutes, then partly separated one hour later to test the adhesion between the primer and the PVC.

We claim:

1. Aqueous electrodeposition coating baths containing cathodically depositable binders and having a content of homopolymers or copolymers of an alkyl vinyl ether, characterised in that the baths contain the following surface-improving additives:
   - 0.1 to 5 wt.% of one or more homopolymers or copolymers of an alkyl vinyl ether with 1 to 5 carbon atoms in the alkyl radical and having a weight average molecular weight of 600 to 10000, together with
   - 0.1 to 2 wt.% of one or more polyesters comprising $\beta$-hydroxyalkyl ester groups, with an acid number of 0 to 3 and a weight average molecular weight of 1000 to 10000, the percentages by weight relating to the solids in the binders, and the proportions by weight of alkyl vinyl ether homopolymers or copolymers to polyester being in the ratio 1:10 to 10:1, relative in each case to the resin solids.

2. Electrodeposition coating baths according to claim 1, characterised in that the polyesters comprising $\beta$-hyroxyalkyl ester groups are chosen so that they are miscible to only a limited extent with the binders in the electrodeposition coating bath.

3. A method of coating electrically conductive substrates in which the substrate is the cathode and immersed in an aqueous electrodeposition coating bath containing a cathodically depositable binder, a film of lacquer is cathodically deposited on to the substrate, the substrate is taken out of the electrodeposition coating bath and the lacquer film is stoved, characterised by use of an aqueous electrodeposition coating bath to which the following surface-improving substances are added:
   - 0.1 to 5 wt.% of one or more homopolymers or copolymers of an alkyl vinyl ether with 1 to 5 carbon atoms in the alkyl radical and having a weight average molecular weight of 500 to 10000, together with
   - 0.1 to 2 wt.% of one or more polyesters comprising $\beta$-hydroxyalkyl ester groups with an acid number of 0 to 3 and a weight average molecular weight of 1000 to 10000, the percentages by weight relating to the solids in the binders, and the proportions by weight of alkyl vinyl ether homopolymers or copolymers to polyester being in the ratio 1:10 to 10:1, relative in each case to the resin solids.

4. A method according to claim 3, characterised in that one or more polyesters comprising $\beta$-hydroxyalkyl ester groups are added and are chosen so as to be miscible to only a limited extent with the binders in the electrodeposition coating bath.

* * * * *